US005848368A

United States Patent [19]

Allen et al.

[11] Patent Number: 5,848,368

[45] Date of Patent: Dec. 8, 1998

[54] METHOD FOR CONTROLLABLY LOADING HAUL VEHICLES BY A MOBILE LOADING MACHINE

[75] Inventors: William E. Allen, Peoria; Ronald O. Groth, Metamora, both of Ill.

[73] Assignee: Caterpillar Inc., Peoria, Ill.

[21] Appl. No.: 739,472

[22] Filed: Oct. 28, 1996

[51] Int. Cl.[6] .............................. G06F 7/70; G06F 19/00

[52] U.S. Cl. ................................ 701/50; 701/36; 172/4.5

[58] Field of Search .............................. 701/1, 4, 35, 32, 701/50, 200, 36; 177/139, 141; 172/7, 9, 4.5; 37/348; 340/438, 439; 364/468.22, 468.23, 468.24, 478.16, 478.17, 551.01, 567

[56] References Cited

U.S. PATENT DOCUMENTS

| | | | |
|---|---|---|---|
| 4,518,044 | 5/1985 | Wiegardt et al. | 172/7 |
| 4,605,081 | 8/1986 | Helmly, Jr. et al. | 177/25.13 |
| 4,831,539 | 5/1989 | Hagenbuch | 701/207 |
| 4,919,222 | 4/1990 | Kyrtsos et al. | 177/139 |
| 5,065,326 | 11/1991 | Sahm | 701/50 |
| 5,178,226 | 1/1993 | Bowman et al. | 177/139 |
| 5,182,712 | 1/1993 | Kyrtsos et al. | 701/50 |
| 5,250,761 | 10/1993 | Koyanagi | 177/141 |
| 5,327,347 | 7/1994 | Hagenbuch | 701/50 |
| 5,448,479 | 9/1995 | Kemner et al. | 701/23 |
| 5,469,356 | 11/1995 | Hawkins et al. | 701/50 |

FOREIGN PATENT DOCUMENTS

| | | | |
|---|---|---|---|
| 645186 | 11/1976 | U.S.S.R. | 681/178 |

OTHER PUBLICATIONS

Australian Patent Application—Intl. No. G07C 005/00—Sep. 17, 1987.

Australian Patent Application No. PCT/JP93/00870—Jun. 25, 1993.

Canadian Patent application—Intl. No. G01G–019/415 Filed May 16, 1991.

EP—0,540,741 A1—Jul. 5, 1991 Int. Cl. G01G 19/10.

*Primary Examiner*—Tan Q. Nguyen
*Assistant Examiner*—Gertude Arthur

[57] ABSTRACT

A method is disclosed for controllably loading a haul vehicle 110, with a payload material 115 desired by a customer, using a mobile loading machine 120. An identification tag 135, located on the haul vehicle 110, is read by an identification tag reader 140, located on the mobile loading machine 120. A haul vehicle identification signal is produced from the reading, and compared to customer data files 125. A load command signal, containing selected information from the customer data file 125 that corresponds with the haul vehicle identification signal, is produced.

8 Claims, 3 Drawing Sheets

130
125
115
120
145
126
131
155
140
135
110
CUSTOMER ORDER
165
MOBILE CUSTOMER ORDER
166

METHOD FOR CONTROLLABLY LOADING HAUL VEHICLES BY A MOBILE LOADING MACHINE

TECHNICAL FIELD

This invention relates generally to a method for controllably loading haul vehicles with a payload material using a mobile loading machine, and more particularly to a method for using a customer data file for controllably loading a haul vehicle with a payload material by a mobile loading machine.

BACKGROUND ART

In quarries and other types of payload material collection sites, mobile loading machines such as wheel loaders, back-hoe loaders, and track-type loaders are used to load payload material onto haul vehicles. Because the mobile loading machine is an integral part of the quarry operation, it is usually under control of the quarry.

Typically, the haul vehicles, such as dump-trucks, are not owned by the quarries, but by individual customers. This usually requires quarry personnel to interact with each haul vehicle operator every time they come to the quarry, to determine who the customer is and the type and the amount of payload material desired by the customer. Also, payload information, including the desired type and amount of payload material for each haul vehicle, needs to be communicated to the quarry personnel who operate the mobile loading machine. Verbal interaction between quarry personnel and haul vehicle operators can be time consuming and is prone to error.

To determine if a haul vehicle has been loaded with the desired amount of payload material, the haul vehicle is usually driven onto scales and weighed. If the haul vehicle is overloaded, some of the payload material must be removed. Alternatively, if the haul vehicle is underloaded, more payload material must be added. After removing or adding payload material the haul vehicle is driven onto the scales and weighed again. This process costs additional time and money.

The actual amount and type of material loaded on each haul vehicle needs to be determined for billing and other purposes. This also requires quarry personnel to correctly match each haul vehicle with a corresponding customer.

The present invention is directed to overcoming one or more of the problems as set forth above.

DISCLOSURE OF THE INVENTION

In the present invention, a method for controllably loading haul vehicles with a payload material by a mobile loading machine is provided. Each of the haul vehicles has a identification tag located on it. An identification tag reader, located on the mobile loading machine, reads the identification tag and responsively produces a haul vehicle identification signal. The mobile loading machine accesses a customer data file. The customer data file and the haul vehicle identification signals are compared. A load command signal is produced in response to the comparison.

DESCRIPTION OF THE DRAWINGS

For a better understanding of the invention, reference may be made to the accompanying drawings, in which.

BEST MODE FOR CARRYING OUT THE INVENTION

The present invention provides a method for controllably loading haul vehicles with a payload material using a mobile loading machine. The mobile loading machine is the type often used in mines and quarries for moving payload material. Some examples of mobile loading machines include wheel loaders, back-hoe loaders, and track-type loaders.

Figure 1:
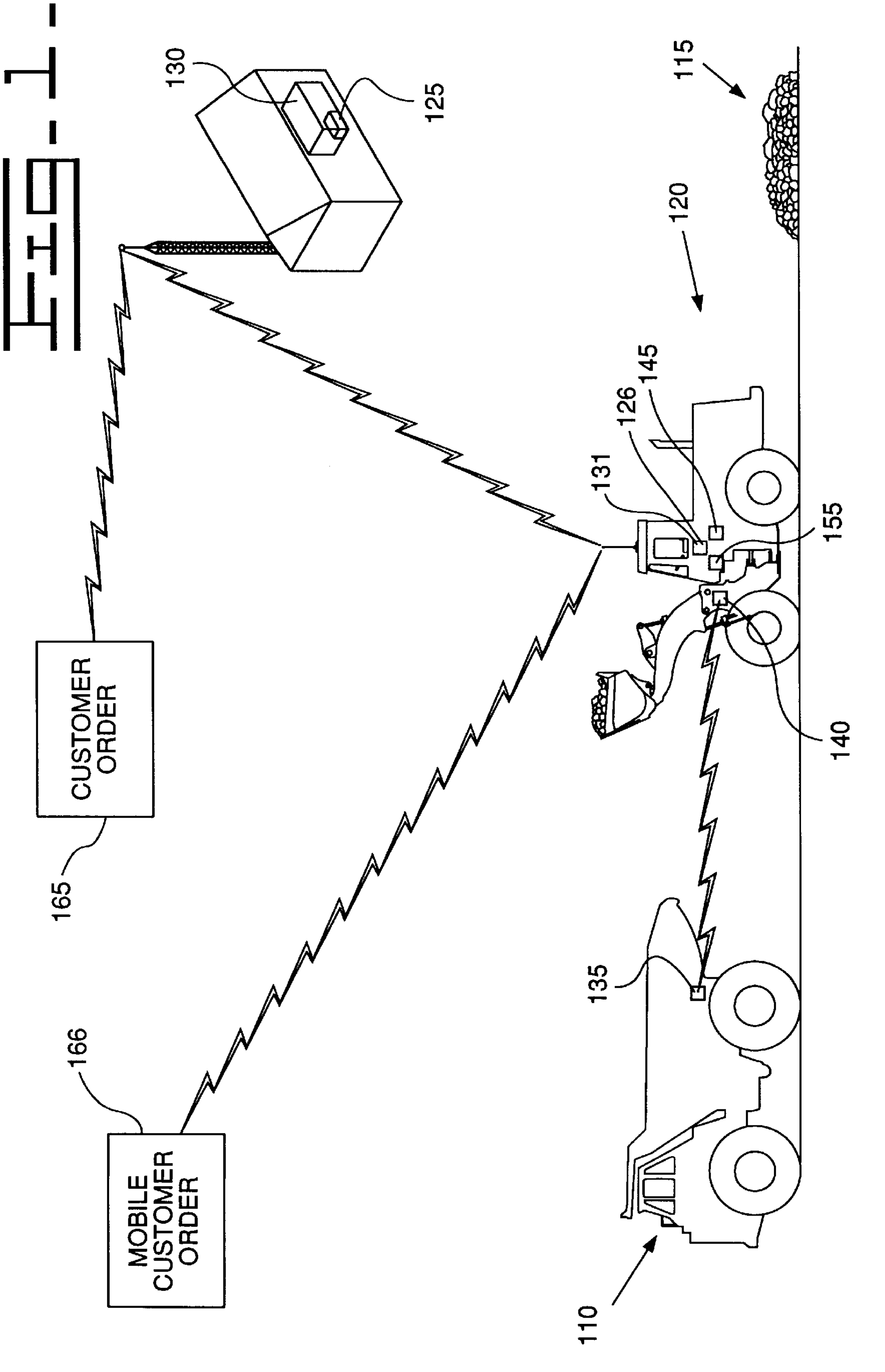
FIG. 1 is a diagram illustrating an embodiment of the invention.

FIG. 1 shows a diagram illustrating an embodiment of the invention, including a haul vehicle 110, a mobile loading machine 120, payload material 115, a base computer 130, and a mobile computer 131.

In the preferred embodiment, a haul vehicle 110 is registered the first time it comes into a quarry. The process of registration includes obtaining customer information. The type of customer information needed for registration is determined by quarry requirements. Some examples of the types of customer information include: the customers' name, the customers' billing address, and the maximum payload for the haul vehicle 110 being registered. The customer information is stored and maintained in a customer data file 125 located in a base computer 130.

Registration also includes the process of assigning an identification tag 135 to the haul vehicle 110. To identify the haul vehicle 110, the identification tag 135 includes a machine readable identification code designed to be read by a corresponding identification tag reader 140. Various types of machine readable identification tag systems are well known in the art, two examples being radio frequency identification tag systems and optically scannable identification tag systems. In the preferred embodiment, a radio frequency tag system is used. The identification tag 135 is located on the haul vehicle 110 and the identification tag reader 140 is located on the mobile loading machine 120.

Customer orders 165 are received and communicated to the base computer 130. A customer order 165 may include payload information, for example, the desired type and the desired amount of payload material 115. As is well known in the art, computers can be designed to receive data, such as a customer order 165, through various forms of input, for example, an operator keyboard, a modem phone line, and a telemetry arrangement. Selected information from the customer order 165 is used to update the customer data file 125.

The base computer 130 and the mobile loading machine 120 are designed to be in communication with each other. The quarry requirements and the capabilities of the mobile loading machine 120 will determine the location of the base computer 130. If the base computer 130 is located in a remote location, such as a quarry office, a telemetry system may be used for communication between the base computer 130 and the mobile loading machine 120. However, the computer may be a mobile computer 131 located directly onboard the mobile loading machine 120. The mobile computer 131 could contain a mobile customer data file 126. The mobile computer 131 could directly receive a mobile customer order 166 and update the mobile data file 126 accordingly.

Figure 2:
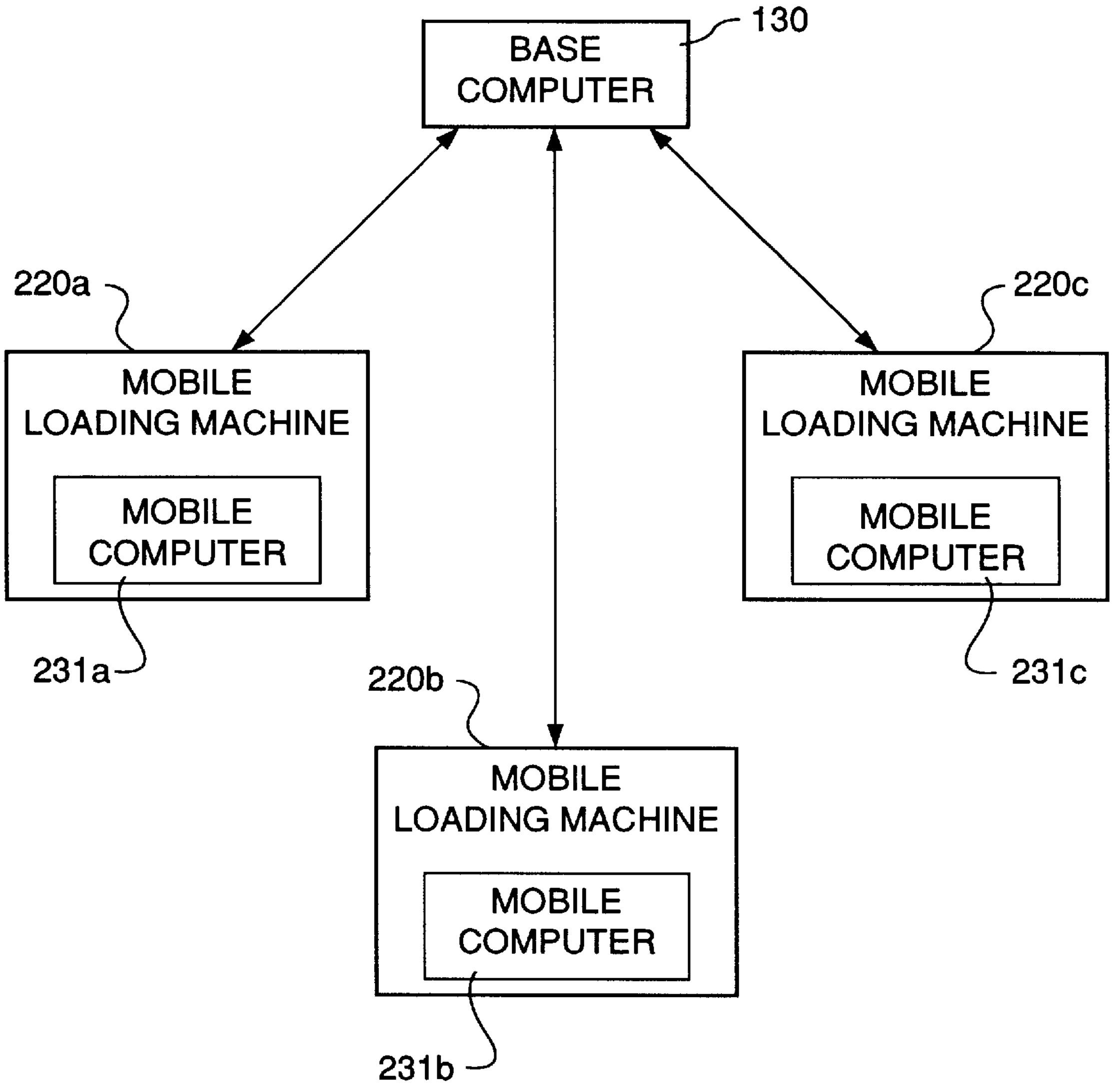
FIG. 2 is a block diagram of a base computer and the relationship to one or more mobile loading machines suitable for the invention.

Also, two or more computers could be used. As shown in FIG. 2, one or more mobile loading machines 220*a* 220*b* 220*c*, each having a mobile computer 231*a* 231*b* 231*c* located onboard, are in communication with the base computer 130. Communication between the mobile loading machines 221*a* 221*b* 221*c* and the base computer 130 is achieved by a suitable form of telemetry, as is well understood in the art. The base computer 130, is used in part to store and maintain the customer data files 125.

Referring back to FIG. 1, in the preferred embodiment, the mobile loading machine 120 includes a payload monitoring system 145. As is well know in the art, payload monitoring systems can be used to determine the actual amount of payload material 115 being loaded onto a haul vehicle 110 by a mobile loading machine 120. The value for the actual amount of payload material 115 being loaded onto the haul vehicle 110 is displayed on a visual operator display 155 located on the mobile loading machine 120. The usage of visual operator displays 155 is well known in the art, one example being a vehicle information management system (VIMS) which provides status information about the mobile loading machine 120 to the operator. The value for the actual amount of payload material 115 loaded onto the haul vehicle 110 is communicated to the base computer 130 where the customer data file 125 is updated accordingly.

If the mobile loading machine 120 includes the capabilities to operate autonomously, the customer data file 125 and the payload monitoring system 145 may be integrated with the autonomous machine system. As is well known in the art, autonomous machine systems integrate electronic monitoring systems and electronic control systems to remotely control the operation of the machine. In such an alternative embodiment, the mobile loading machine 120 would autonomously load the haul vehicle 110 with the desired type and amount of payload material 115 determined from the customer order 165.

Figure 3:
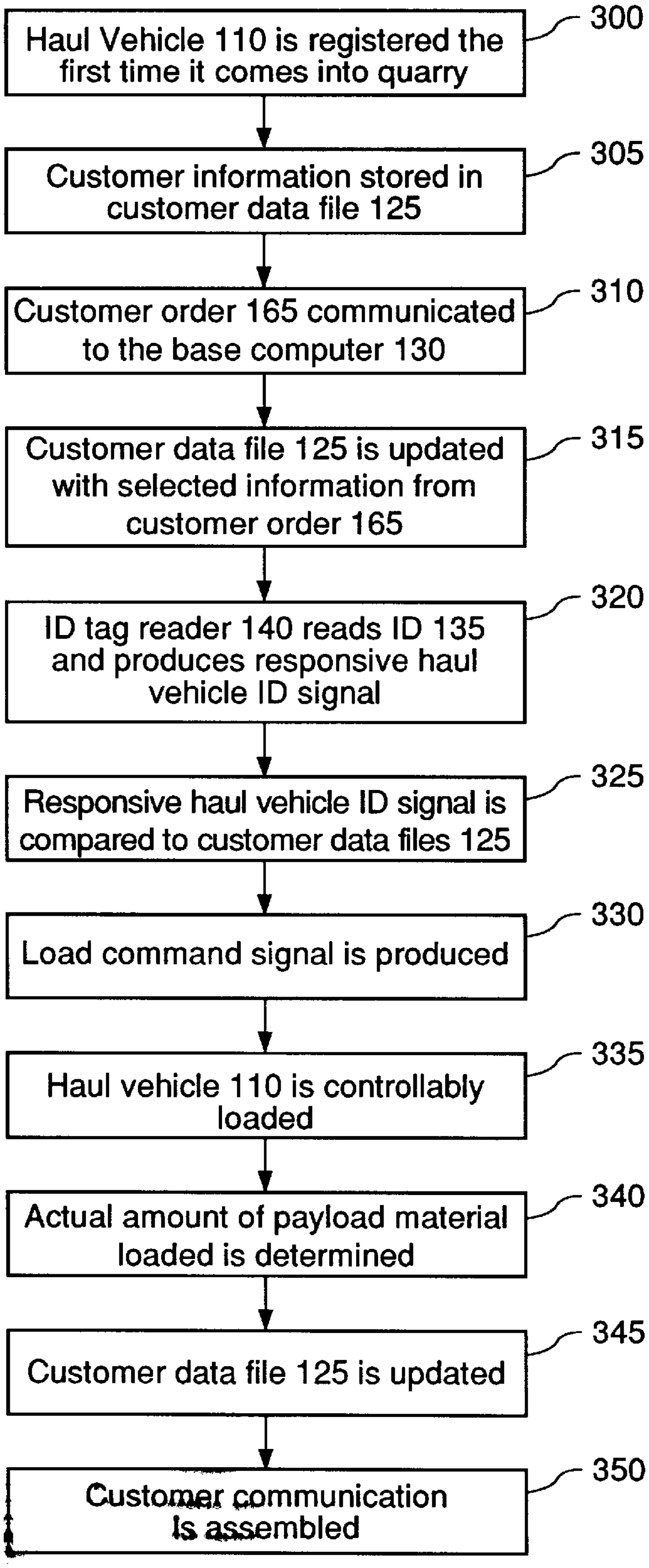
FIG. 3 is a functional flowchart illustrating a method of an embodiment of the invention.

In the flow chart of FIG. 3, a haul vehicle 110 is registered the first time it comes into a quarry as indicated in the first command block 300. Registration involves assigning a identification tag 135 to the haul vehicle 110, in addition to obtaining customer information, such as the customers name and the customers billing address. The customer information and code for the assigned identification tag 135 is stored in a customer data file 125 located in the base computer 130 as indicated in the next command block 305.

As indicated in the next command block 310, a customer order 165 is controllably communicated to the base computer 130. A customer order 165, can be communicated to the base computer 130 any time after registration. The customer order 165 could include payload information, such as the desired type and the desired amount of payload material 115. The customer data file 125 is updated with selected information from the customer order 165, as indicated in the next command block 315.

The haul vehicle identification tag 135 is read by an identification tag reader 140 included on the mobile loading machine 120. A responsive haul vehicle identification signal is responsively produced as a result of the reading, as indicated in the next command block 320. The responsive haul vehicle identification signal is communicated to the base computer 130 and compared to the customer data files 125, as indicated in the next command block 325. The comparison is used to determine the particular customer data file 125 that corresponds to the responsive haul vehicle identification signal.

As indicated in the next command block 330, a load command signal is produced as a result of the above comparison. Selected information from the corresponding customer data file 125, such as the desired type and the desired amount of payload material 115, is included in the load command signal. In the preferred embodiment the load command signal is produced in a format used in a visual operator display 155 included on the mobile loading machine 120. The desired payload material information is displayed to the mobile loading machine operator on the visual operator display 155.

In an alternative embodiment, the mobile loading machine 120 is configured to operate autonomously. The load command signal is produced in a format which integrates with the electronic monitoring and control systems used to autonomously control the mobile loading machine 120. The autonomous control of machines by using electronic monitoring and control systems is well known in the art. The load command signal integrated with the autonomous system includes selected information from the corresponding customer data file 125, such as the desired type and the desired amount of payload material 115.

As indicated in the next command block 335, the haul vehicle 110 is controllably loaded with the payload material 115 by the mobile loading machine 120. In the preferred embodiment, the mobile loading machine operator uses the desired payload information displayed on the visual operator display 155 to controllably operate the mobile loading machine 120 and load the haul vehicle 110 with the desired payload material 115. If the mobile loading machine 120 is autonomous, the desired payload information is integrated with the autonomous monitoring and control systems. The autonomous system uses the desired payload information to controllably operate the mobile loading machine 120 and load the haul vehicle 110 with the desired payload material 115.

In the preferred embodiment, a payload monitoring system 145 is used to determine the actual amount of payload material 115 loaded on the haul vehicle 110 by the mobile loading machine 120, as indicated in the next command block 340. Next, the customer data file 125, as indicated in the next command block 345, is updated to include the actual amount of payload material 115 being loaded onto the haul vehicle 110 by the mobile loading machine 120.

As indicated in the last command block 350, a customer communication, including selected information from the customer data file 125 and the value of the actual amount of payload material 115 loaded, is prepared. The customer communication could be in various formats, such as a paper or electronic receipt, or invoice, or bill.

INDUSTRIAL APPLICATION

In the preferred embodiment of the invention, a haul vehicle 110 is registered the first time it comes to the quarry. Registration includes the process of obtaining customer information, such as the name of the customer and billing address associated with the haul vehicle 110, and storing the information in a customer data file 125 located in the base computer 130. Registration also includes, assigning an identification tag 135 to the haul vehicle and storing the identification tag code in the corresponding customer data file. A customer order 165, including the customers' desired type and amount of payload material 115, is communicated to the base computer 130, and stored in the corresponding customer data file 125.

The haul vehicle 110 is placed in a position to be loaded with a payload material 115 by the mobile loading machine 120. The identification tag 135 located on the haul vehicle 110 is read by an identification tag reader 140 located on the mobile loading machine 120. In response, an identification signal, corresponding to the reading of the identification tag 135, is communicated by the mobile loading machine 120 to the base computer 130. The base computer 130 compares the identification signal with the customer data files 125 and determines the particular customer data file 125 that corresponds to the identification signal. A load command signal, containing selected information from the corresponding customer data file 125, is generated and communicated to the mobile loading machine 120. The load command signal includes payload information from the customer order 165, such as the customers desired type and amount of payload material 115.

In the preferred embodiment, the mobile loading machine 120 includes a visual operator display 155. The visual operator display 155, is a display which provides the mobile loading machine operator with information, such as information relating to the mobile loading machines current status. The load command signal, containing the desired payload information, is configured to be displayed on the visual operator display 155. The mobile loading machine operator uses the payload information displayed on the visual operator display 155 to controllably load the customers' desired type and amount of payload material 115 onto the haul vehicle 110 with the mobile loading machine 120.

Also included on the mobile loading machine 120, in the preferred embodiment, is a payload monitoring system 145. The payload monitoring system 145 is used to determine the actual amount of payload material 115 loaded onto the haul vehicle 110 by the mobile loading machine 120. The value for the actual amount of payload material 115 loaded is communicated to the base computer 130, where the value is used in the assembling of a customer response, such as a customer bill.

We claim:

1. A method for controllably loading haul vehicles with a payload material using a mobile loading machine, each of said haul vehicles having an identification tag readable by an identification tag reader, and said identification tag reader being located on said mobile loading machine, including the steps of:

reading the identification tag associated with a selected haul vehicle;

producing a responsive haul vehicle identification signal;

providing a customer data file accessible to mobile loading machine;

comparing said haul vehicle identification signal to said customer data file; and producing a load command signal in response to said comparison, wherein said load command signal includes information responsive to said customer data file.

2. A method, as set forth in claim 1, including the step of controllably loading said haul vehicle in response to said load command signal.

3. A method, as set forth in claim 1, including the step of displaying said load command signal information to an operator of said mobile loading machine.

4. A method, as set forth in claim 2, wherein said mobile loading machine includes a payload monitoring system, and said customer data file includes a desired amount of payload material, including the steps of:

determining an actual amount of payload material being loaded on said haul vehicle; and comparing the actual amount of payload material with the desired amount of payload material.

5. A method, as set forth in claim 1, including the steps of:

providing a computer accessible to said mobile loading machine;

maintaining a customer data file accessible to said computer;

receiving a customer order;

storing at least a portion of said customer order in said customer data file; and communicating the customer data file with the mobile loading machine.

6. A method, as set forth in claim 5, wherein said customer data file includes at least one of a type of payload material and an amount of payload material specified by said customer order.

7. A method, as set forth in claim 5, wherein said mobile loading machine includes a payload monitoring system, including the steps of:

determining an actual amount of payload material loaded on said haul vehicle;

communicating said actual amount of payload material to said computer; and updating said customer data file.

8. A method, as set forth in claim 7, including the step of preparing a customer communication in response to said updated customer data file.

* * * * *